(12) United States Patent
Perry et al.

(10) Patent No.: US 7,883,267 B2
(45) Date of Patent: Feb. 8, 2011

(54) FOOD THERMOMETER SLEEVE

(75) Inventors: Marco Perry, Brooklyn, NY (US); Todd Brunner, Brooklyn, NY (US); Jim Best, Hewitt, NJ (US)

(73) Assignee: Helen of Troy Limited, St. Michael (BB)

( * ) Notice: Subject to any disclaimer, the term of this patent is extended or adjusted under 35 U.S.C. 154(b) by 405 days.

(21) Appl. No.: 12/075,912

(22) Filed: Mar. 14, 2008

(65) Prior Publication Data

US 2009/0232187 A1   Sep. 17, 2009

(51) Int. Cl.
*G01K 1/00*   (2006.01)
*G01K 1/14*   (2006.01)
*G01K 1/06*   (2006.01)
*G01K 1/08*   (2006.01)

(52) U.S. Cl. .................. 374/141; 374/208; 374/100

(58) Field of Classification Search ............... 374/100, 374/141, 148–151.163, 179, 183, 185, 208, 374/120–121, 160–161, 178; 116/216; 73/866.5; D10/57

See application file for complete search history.

(56) References Cited

U.S. PATENT DOCUMENTS

| | | | |
|---|---|---|---|
| 233,963 A | 11/1880 | Barry | |
| 507,529 A | 10/1893 | Doe | |
| 821,141 A | 5/1906 | Ude | |
| 1,495,100 A | 5/1924 | Nurnberg | |
| 1,919,630 A | 7/1928 | Greiner, Jr, | |
| 2,577,669 A | 4/1945 | Wilson | |
| 2,672,053 A | 7/1952 | Geyer | |
| 2,787,937 A | 4/1957 | Prisament | |
| 2,866,338 A * | 12/1958 | Muncheryan | ............... 374/150 |
| 3,052,158 A | 9/1962 | Sonni | |
| 3,218,861 A | 11/1965 | Moore et al. | |
| 3,283,894 A | 11/1966 | Hafner et al. | |
| 3,350,736 A | 11/1967 | Frazelle et al. | |
| 3,738,037 A | 6/1973 | Daley | |
| 3,905,232 A | 9/1975 | Knute | |
| 3,952,597 A | 4/1976 | Witonsky et al. | |
| 4,044,614 A | 8/1977 | Beckman | |
| 4,059,997 A | 11/1977 | Trott | |
| 4,082,000 A | 4/1978 | Volk | |
| 4,158,966 A | 6/1979 | Beckman | |
| 4,170,138 A | 10/1979 | Wiebe | |
| 4,207,695 A | 6/1980 | Penza | |
| 5,004,355 A | 4/1991 | Ryan | |
| D317,129 S * | 5/1991 | Beranek et al. | ............... D10/57 |
| 5,388,698 A | 2/1995 | Wakao | |
| D399,436 S * | 10/1998 | Schwarz | ............... D10/57 |
| D414,435 S * | 9/1999 | Nahon | ............... D10/57 |

(Continued)

OTHER PUBLICATIONS

International Search Report and Written Opinion dated Jan. 7, 2010 re PCT/US09/36617.

*Primary Examiner*—Gail Verbitsky
(74) *Attorney, Agent, or Firm*—Seyfarth Shaw LLP

(57) ABSTRACT

A protective sleeve for a food thermometer having a probe for insertion into a food is disclosed. The sleeve includes a first body and a second body rotatably positioned within the first body. Each body includes opposing open ends and a sidewall there between, with the second body having indicia displayed thereon. An opening within the sidewall of the first body allows the indicia, which are preferably related to cooking instructions, on the sidewall of the second body to be read.

12 Claims, 4 Drawing Sheets

U.S. PATENT DOCUMENTS

| | | |
|---|---|---|
| 6,039,177 A | 3/2000 | Swanson et al. |
| 6,065,391 A | 5/2000 | Archard et al. |
| 6,854,880 B2 * | 2/2005 | Hsieh .......................... 374/163 |
| 6,939,039 B2 | 9/2005 | Brunvoll |
| 6,957,911 B2 | 10/2005 | Wong et al. |
| 7,455,451 B2 * | 11/2008 | Pearl et al. .................. 374/141 |
| 2004/0125854 A1 | 7/2004 | Liu et al. |
| 2005/0201445 A1 * | 9/2005 | Harris et al. ................ 374/155 |
| 2006/0051156 A1 | 3/2006 | Bhavnani |
| 2007/0067118 A1 | 3/2007 | Cooper |

* cited by examiner

FOOD THERMOMETER SLEEVE

TECHNICAL FIELD OF THE INVENTION

The present device relates to a sleeve used to cover the probe portion of a food thermometer. Particularly, the present device relates to a food thermometer sleeve which protects the probe when not in use and also provides valuable cooking information.

BACKGROUND OF THE INVENTION

There are several types of thermometers in use today. Clinical thermometers are used to take the temperature of a person or animal. Chemical thermometers are used, for example, to monitor a reaction temperature. Both of these thermometer types can have either an analog or digital display of the measured temperature.

As to food thermometers, these have been used for indicating the amount that a food product is cooked, often referred to as its "doneness." Some of these food thermometer devices incorporate a separate probe which is inserted into the food. The sensitive probe is in operative communication with a temperature measuring device capable of displaying the temperature, or which in-turn connects to a display.

While such thermometers are a great help in proper food preparation, they are not without problems. For example, when not in use, the potentially sensitive temperature probe may be subject to damage when placed with other kitchen utensils. Also, while a temperature is ultimately displayed by the thermometer, users may be uncertain as to what temperature is desirable for different foods.

The present invention is intended to address these and other possible problems associated with food thermometers.

SUMMARY OF THE INVENTION

There is disclosed herein an improved protective sleeve for a thermometer probe which avoids the disadvantages of prior devices while affording additional structural and operating advantages.

In a preferred embodiment, the protective sleeve houses a probe portion of a food thermometer which is inserted into a food during cooking. The sleeve preferably includes two cylindrical bodies: a first body having opposing open ends and a sidewall there between, and a second body having opposing open ends and a sidewall having indicia displayed thereon. A portion of the sidewall of the second body is preferably rotatably positioned adjacent the first body such that an opening within the sidewall of the first body allows indicia on the sidewall of the second body, such indicia preferably being related to cooking instructions, to be read through the opening.

In an embodiment of the invention, the protective sleeve may include a cover, preferably magnifying, over the opening and attached to the first body. The cover may be clear and movable between a closed and an open position. A textured surface on one of either the first body or the second body may be included to facilitate rotation of the two bodies relative to one another. The sleeve may also be tethered to the thermometer to prevent separation and loss.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
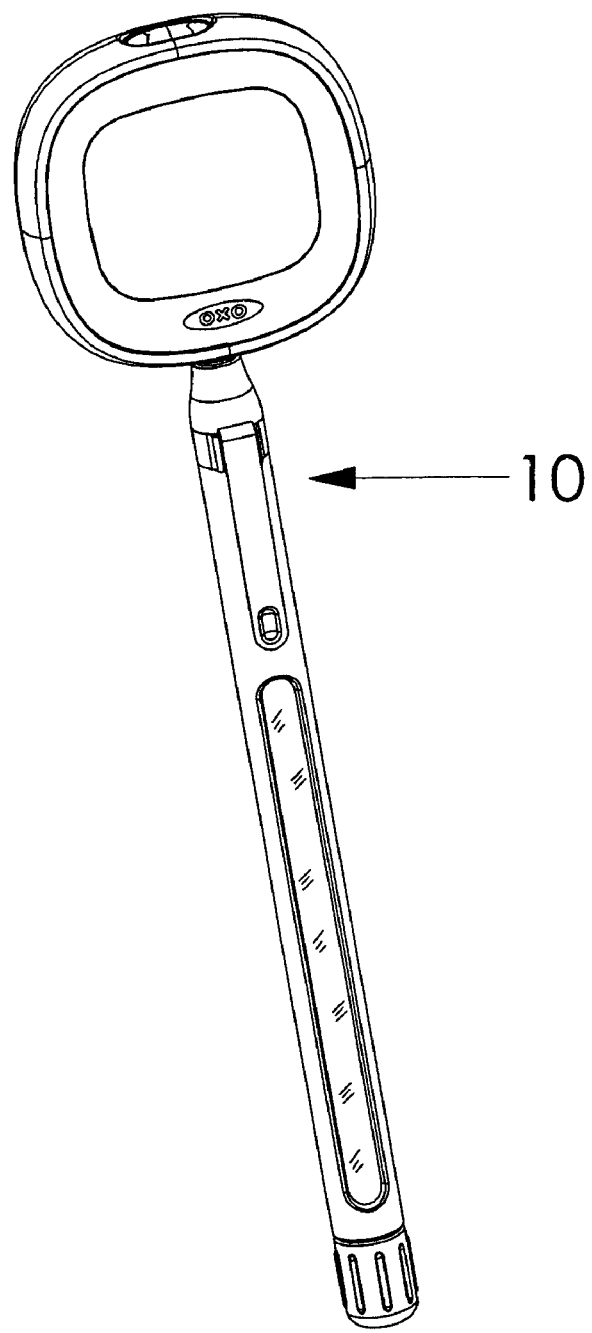
FIG. 1 is a perspective view of an embodiment of the present protective sleeve having a food temperature probe inserted therein.
Figure 2:
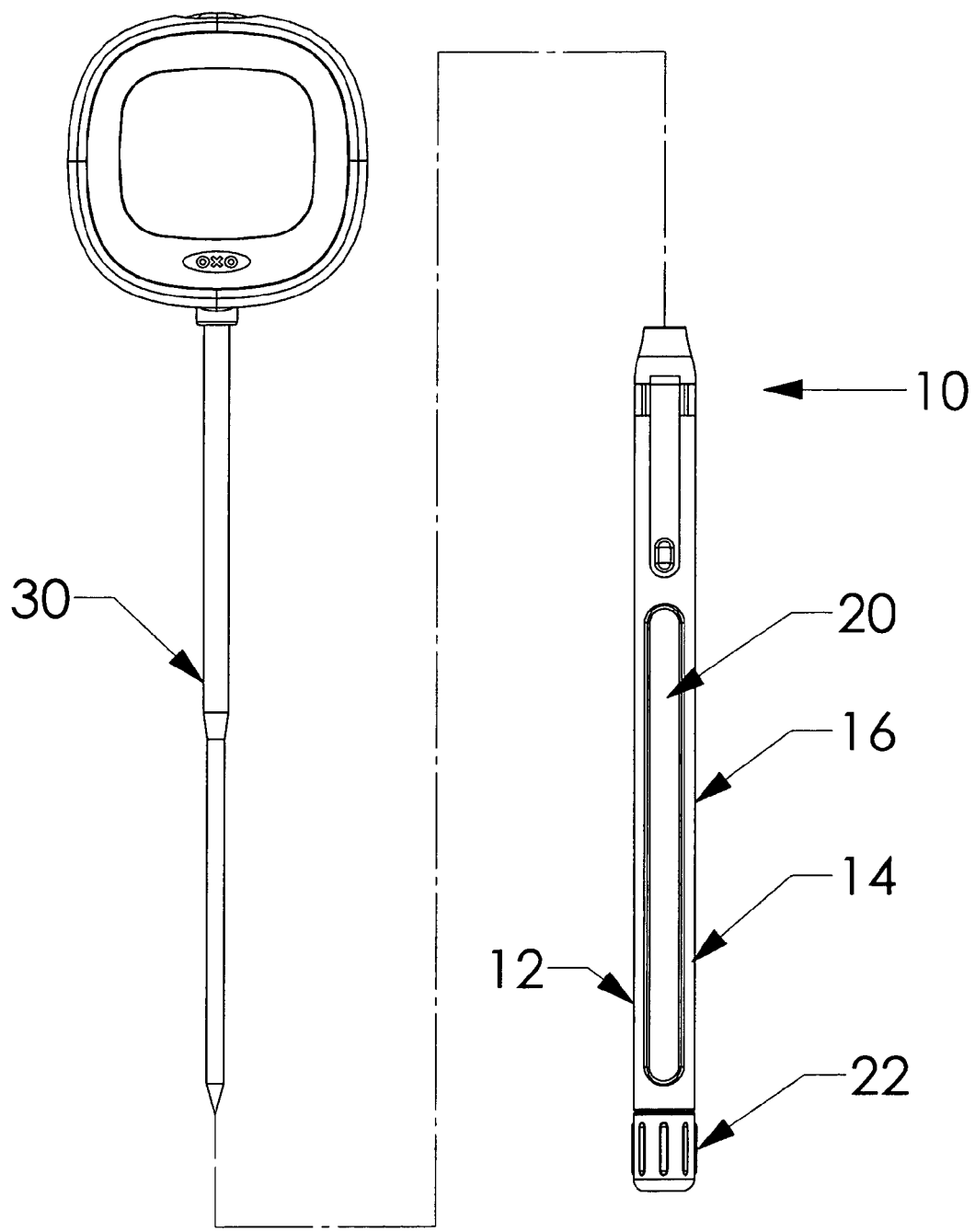
FIG. 2 is a side view of the components of FIG. 1 shown separated.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-4, there is illustrated a protective sleeve for a probe portion of a food thermometer, the sleeve being generally designated by the numeral 10. The probe 30 illustrated is a digital food thermometer manufactured and sold by OXO International, New York, N.Y. Of course, the disclosed sleeve 10 may be easily modified, as to size and shape, for example, for use with any number of similar food or meat thermometers in the industry.

The sleeve 10 is preferably comprised of at least two coaxially-positioned, preferably cylindrical bodies. Shown is a first body 12 having opposing open ends 40 and a sidewall 14, and a second body 16 having opposing open ends 42 and a sidewall 18. The two cylindrical bodies, 12 and 16, are preferably made of a high to medium-temperature resistant polymer, but may be manufactured using metal, such as a stainless steel or the like.

Figure 3:
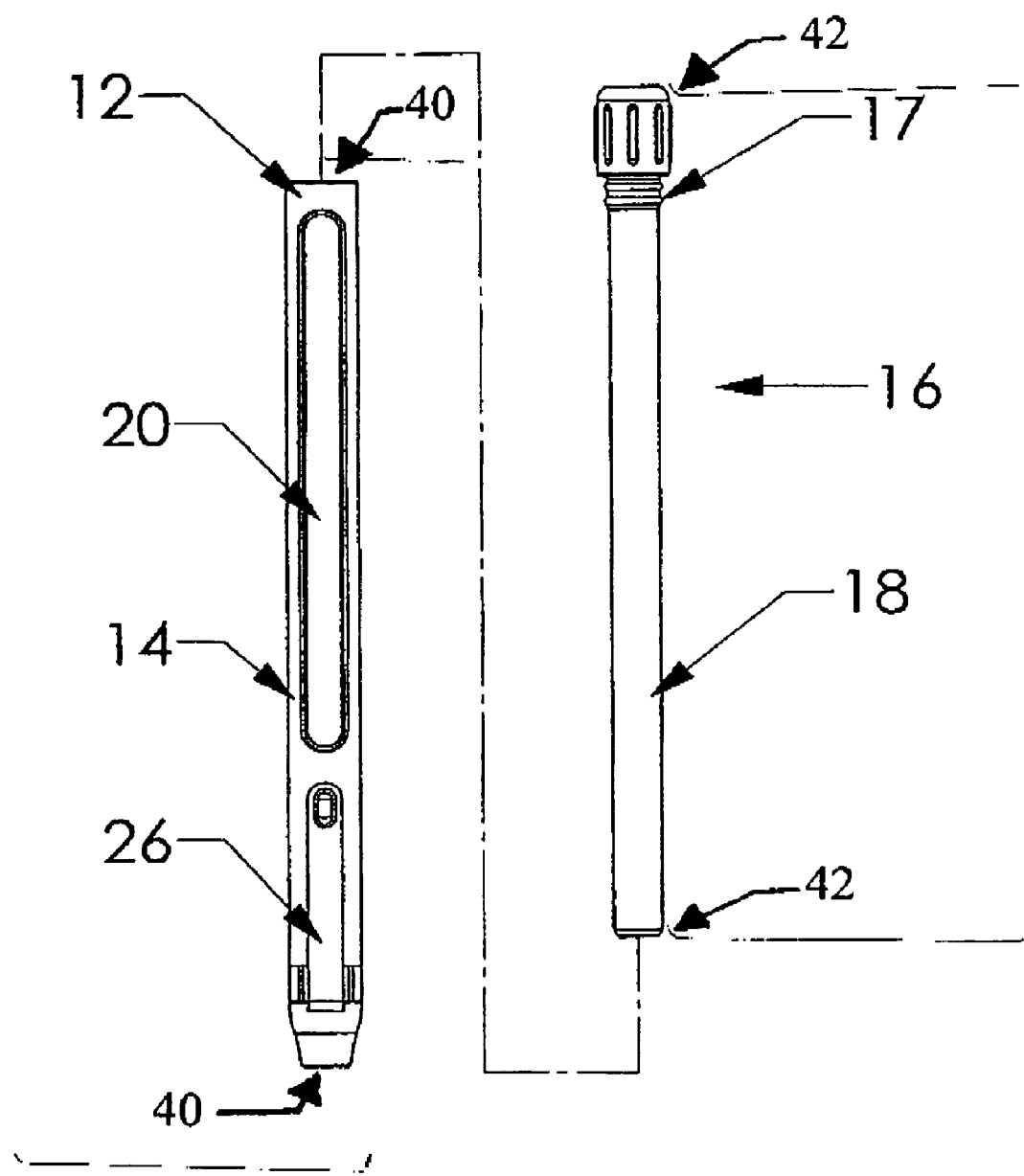
FIG. 3 is a side disassembled view of an embodiment of the protective sleeve.
Figure 4:
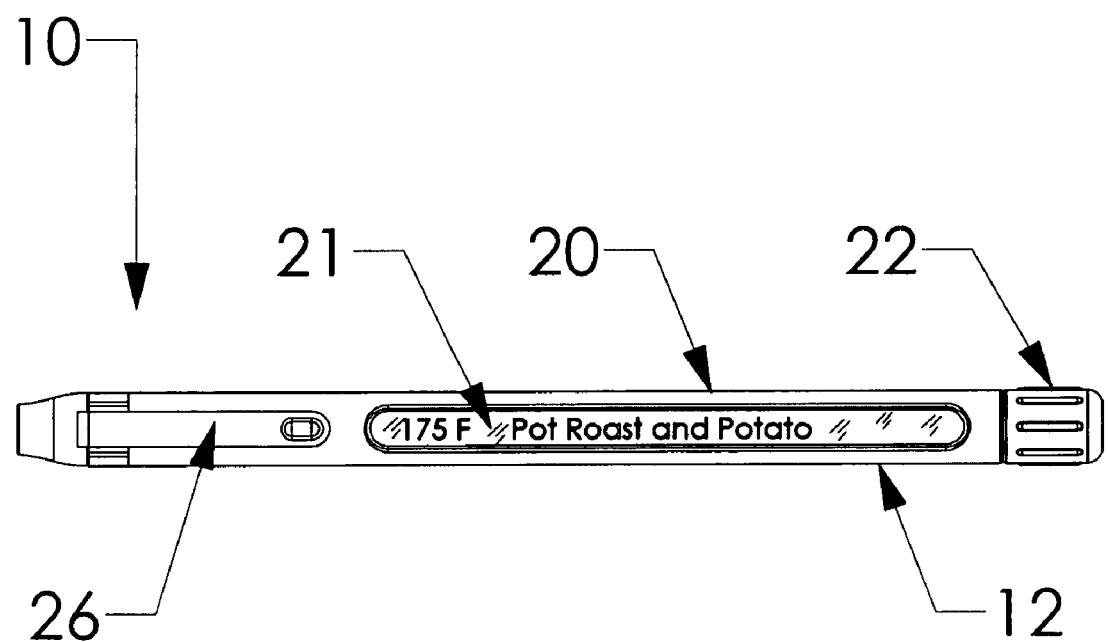
FIG. 4 is a close-up of an embodiment of the protective sleeve showing viewable indicia.

The sidewall 18 of the second body 16 is preferably secured within the first body 12. A snap-fit collar 17 is shown in FIG. 3, which allows the two components to be readily assembled and disassembled, as needed. Other attachment means, including those of a more permanent nature, are feasible alternatives.

Sidewall 18 also includes indicia displayed thereon. An opening 20, such as a window or simple cut-out section, is preferably defined within the sidewall 14 of the first body 12 to allow the indicia on the sidewall 18 of the second body 16 to be viewed. A cover (21) may be used to protect the indicia from being contacted by water or other liquids, food, or other possible contaminates. Preferably, the cover is comprised of a small piece of flexible plastic. It is also preferred that the cover should provide magnification of the indicia.

The indicia may be directly printed on the sidewall 18 using any of the known methods for such a printing or, alternatively, the indicia may be printed on a medium which is adhered to the sidewall 18. In fact, such medium, such as paper, may be removable so that it can be replaced or interchanged, as necessary. In such an embodiment, the sleeve 10 may be disassembled (as discussed above) to provide access to the indicia carrying medium. Alternatively, the cover (not shown) over the opening 20 may be movable between an open and a closed position, or it may be removable entirely to provide such access. Such design modifications would be well-understood by those skilled in the relevant art.

In a preferred embodiment, the indicia are related to food cooking instructions, such as oven or meat temperatures, cooking times, etc. However, other indicia not related to cooking instructions would be possible, such as seasoning tips, meat cuts, U.S. to metric conversions for measuring volume and weights, and the like.

Further, it is preferred that at least a portion of the sidewall 18 of the second body 16 is rotatably positioned adjacent the first body. With rotation of the second body 16, all the indicia of the sidewall 18 can be viewed, as necessary or desired. Accordingly, end 22 of the second body 16 extends such that it is uncovered by first body 12. A textured surface may be provided on one of either the first body 12 or on end 22 of the exposed portion of the second body 16 to facilitate rotation of the two bodies relative to one another. The texturing may be provided by, for example, a thermoplastic rubber (TPR) such as SANTOPRENE® adhered in a thin layer to the desired surface area. Alternatively, providing knurling or ribs to either surface may be suitable to facilitate rotation of the bodies.

Additional features, such as pocket clip 26 for clipping the sleeve to an apron or the like, multiple openings (not shown) for displaying added indicia, or a detachable tether (not shown) used for connecting the probe 30 to the sleeve 10 when stored, are contemplated. The use of a tether might be advantageous should the probe 30 and sleeve 10 be inadvertently separated during non-use, such as storage. The tether may be a wire of metal or plastic material, for example, or other such device which might be capable of attachment and detachment using a suitable clasp or other mechanism.

In use, a food thermometer or probe 30 can be inserted into end 22 of the sleeve 10 until completely covered to be protect against damage. Alternatively, the open ends of the sleeve 10 may be identical such that the probe 30 can be inserted into either end. A friction fit or snap fit mechanism (not shown) may be used to retain the probe 30 within the sleeve 10. Further, the probe 30 may extend slightly from the opposite end of the sleeve 10 where the length of the probe 30 exceeds that of the sleeve 10.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A protective sleeve for a food thermometer having a probe for insertion into a food, the sleeve comprising:
    a first body having opposing open ends and a sidewall there between;
    a second body having opposing open ends, a sidewall having indicia related to food cooking instructions displayed thereon, and having a portion of the sidewall being rotatably positioned adjacent the first body; and
    an opening within the sidewall of the first body;
    wherein indicia on the sidewall of the second body are readable through the opening.

2. The protective sleeve of claim 1, further comprising a cover over the opening and attached to the first body.

3. The protective sleeve of claim 2, wherein the cover is clear.

4. The protective sleeve of claim 2, wherein the cover is movable between a closed and an open position.

5. The protective sleeve of claim 2, further comprising a textured surface on one of either the first body or the second body to facilitate rotation of the two bodies relative to one another.

6. The protective sleeve of claim 2, wherein the clear cover magnifies the indicia displayed on the second body.

7. The protective sleeve of claim 1, wherein the probe of the thermometer snap fits into a cavity defined by one of either the first body or the second body.

8. The protective sleeve of claim 7, wherein the probe of the thermometer can be inserted from either open end of the cavity.

9. The protective sleeve of claim 1, wherein the entire probe of the thermometer is housed within the cavity during non-use of the probe.

10. The protective sleeve of claim 1, wherein the sleeve is tethered to the thermometer.

11. The protective sleeve of claim 1, wherein the first body and second body are cylindrical.

12. A protective sleeve for a food thermometer having a probe for insertion into a food, the sleeve comprising:
    a first body having opposing open ends and a sidewall there between;
    a second body having opposing open ends, a sidewall having indicia related to cooking instructions displayed thereon, and having a portion of the sidewall being rotatably positioned adjacent the first body;
    a cavity defined within the sidewall of one of either the first body or the second body;
    an opening within the sidewall of the first body; and
    a clear cover attached to the first body and spanning the opening thereon;
    wherein the probe may be inserted at either end of the cavity and the indicia on the sidewall of the second body are readable through the clear cover across the opening.

* * * * *